United States Patent
Bangalore et al.

(10) Patent No.: US 8,566,102 B1
(45) Date of Patent: Oct. 22, 2013

(54) SYSTEM AND METHOD OF AUTOMATING A SPOKEN DIALOGUE SERVICE

(75) Inventors: Srinivas Bangalore, Morristown, NJ (US); Junlan Feng, North Plainfield, NJ (US); Mazin G Rahim, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1138 days.

(21) Appl. No.: 10/288,764

(22) Filed: Nov. 6, 2002

Related U.S. Application Data

(63) Continuation-in-part of application No. 10/160,461, filed on May 31, 2002, now Pat. No. 7,152,029.

(60) Provisional application No. 60/368,640, filed on Mar. 28, 2002.

(51) Int. Cl.
*G10L 21/00* (2013.01)
(52) U.S. Cl.
USPC ........................................ 704/270.1
(58) Field of Classification Search
USPC ........................................ 704/270.1
See application file for complete search history.

(56) References Cited

U.S. PATENT DOCUMENTS

| | | | | |
|---|---|---|---|---|
| 6,081,774 A * | 6/2000 | de Hita et al. | ............... | 704/9 |
| 6,330,243 B1 * | 12/2001 | Strandberg | ............... | 370/396 |
| 6,434,524 B1 * | 8/2002 | Weber | ............... | 704/257 |
| 6,453,312 B1 * | 9/2002 | Goiffon et al. | ............... | 707/3 |
| 6,460,037 B1 | 10/2002 | Weiss et al. | | |
| 6,523,026 B1 * | 2/2003 | Gillis | ............... | 1/1 |
| 6,567,805 B1 * | 5/2003 | Johnson et al. | ............... | 707/5 |
| 6,665,642 B2 * | 12/2003 | Kanevsky et al. | ............... | 704/260 |
| 6,879,994 B1 * | 4/2005 | Matsliach et al. | ............... | 709/204 |
| 6,901,402 B1 * | 5/2005 | Corston-Oliver et al. | ............... | 1/1 |
| 6,925,432 B2 | 8/2005 | Lee et al. | | |
| 7,058,887 B2 * | 6/2006 | Cragun | ............... | 715/243 |
| 7,092,888 B1 | 8/2006 | McCarthy et al. | | |
| 7,143,042 B1 * | 11/2006 | Sinai et al. | ............... | 704/270.1 |
| 2001/0044757 A1 * | 11/2001 | Robb et al. | ............... | 705/27 |
| 2002/0122063 A1 * | 9/2002 | Weinberg et al. | ............... | 345/764 |
| 2002/0160772 A1 | 10/2002 | Gailey et al. | | |
| 2003/0144846 A1 * | 7/2003 | Denenberg et al. | ............... | 704/277 |
| 2003/0163302 A1 | 8/2003 | Yin | | |
| 2003/0200080 A1 * | 10/2003 | Galanes et al. | ............... | 704/200 |
| 2005/0033582 A1 * | 2/2005 | Gadd et al. | ............... | 704/277 |

OTHER PUBLICATIONS

"Automatic Summarization of Web Content to Smaller Display Devices", by A. Rahman et al., ICDAR 2001.
"An Automatic Dialogue System Generator From The Internet Information Contents", by M. Araki et al., *Eurospeech 2001*, pp. 1743-1746.

(Continued)

*Primary Examiner* — Jakieda Jackson

(57) ABSTRACT

A system and method of generating and operating a spoken dialog service for a web-site are disclosed. The system parses web-site data and organizes the web-site data in a task knowledge data bank. The system receives text associated with a user query; processes the received text in a spoken language understanding (SLU) module, the SLU module using the web-site data from the task knowledge data bank; generates a ranked list of relevant responses to the user query; generates a hierarchical tree using the web-site data and the ranked list of relevant responses to the user query, generates a response to the user query using the hierarchical tree; and presents the response to the user.

33 Claims, 12 Drawing Sheets

(56) References Cited

OTHER PUBLICATIONS

"Flexible Web Document Analysis for Delivery to Narrow-Bandwidth Devices", by G. Penn et al., ICDAR 2001.

"How May I Help You?", by A. Gorin et al., Proc. IVTIA, Basking Ridge, N.J., Oct. 1996.

Internet Web Site: http://www.internetspeech.com, "Internet Speech."

Internet Web Site: http://www.semanticweb.org, "SemanticWeb.org."

Internet Web Site: http://www.speechworks.com, "SpeechWorks."

Internet Web Site: http://www.nuance.com/corp/customers/casestudies/ubs.html, "Nuance."

Feng, Junlan et al., "Machine Learning Approaches to Webpage Structure Understanding", 8 pages, WWW 2005, May 10-14, 2005, Chiba Japan.

Feng, Junlan et al., "Webtalk: Mining Websites for Automatically Building Dialog Systems" 6 pages.

Feng, Junlan et al., "Question-Answer in WebTalk: An Evaluation Study", 4 pages, AT&T Labs Research.

\* cited by examiner

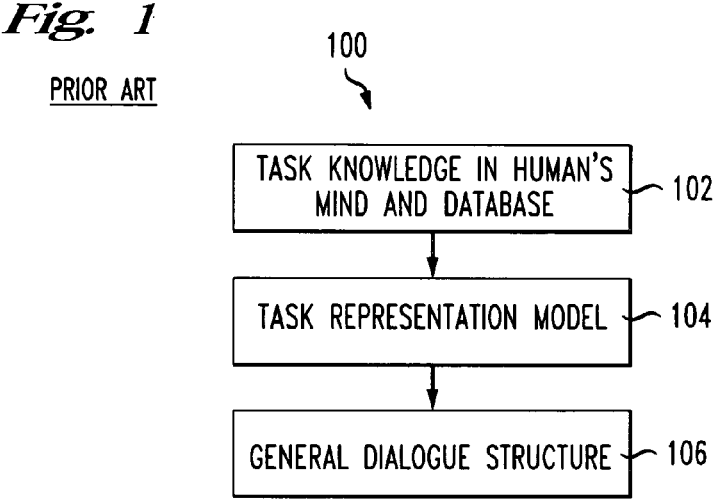
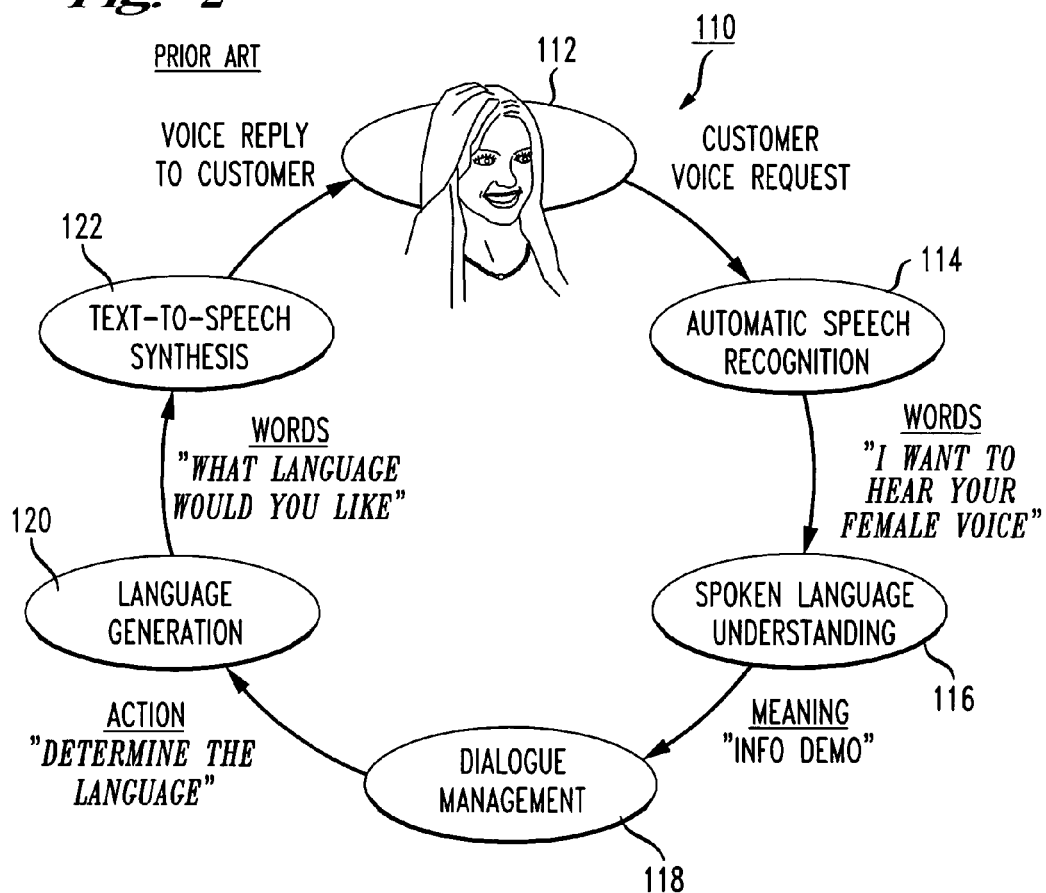

```
<?xml version="1.0"?>
<vxml version="1.0">
  <form>
    <field name="drink">
      <prompt>Would you like coffee,
         tea, milk, or nothing?</prompt>
      <grammar src="drink.gram"
         type="application/x-jsgf"/>
    </field>
    <block>
      <submit next=
         "http://www.drink.example/drink2.asp"/>
    </block>
  </form>
</vxml>
```

*Fig. 5B*

234 {
<T:> Yahoo!-News </T>
<L:> <L/>
<A:> </A>
<L:> </L>
}

236 {
<T:> Yahoo!News</T>
<L> </L>
<A:> Friday,May 3,2002 </A>
<L:> </L>
}

238 {
<T:> full Coverage </T>
<L:> </L>
<A:> Mideast Conflict
Afghanistan
Hague War Crimes Tribunal
Farming and Agriculture
African American News </A>
<L:> ...</L>
}

240 {
<T:> Jobless Rate Hits 6 Percent </T>
<L:> ...</L>
<A:> Fri. May 3, 8:35 AM ET - (AP)
The nation's unemployment rate shop up to 6 percent in April
the highest point in nearly eight years even as U.S. companies
add jobs for the first time in nine months. Full Coverage </A>
<L:> Full Coverage: http//rd.yahoo.com/dailynews/home/storyfc/ap/
ts/ top top/*http://dailynews.yahoo.com/fc/Business/US_Economy/ : </L>
}

242 {
<T:> More Top Headlines: </T>
<L:> </L>
<A:> Israeli Troops Swoop Down on Hamas - (AP)
FBI Warned of Training Before 11th - (AP)
British Troops Begin al-Qaida Sweep - (AP)
Israel, Palestinians Welcome Summit - (AP) </A>
<L:> .....</L>
}

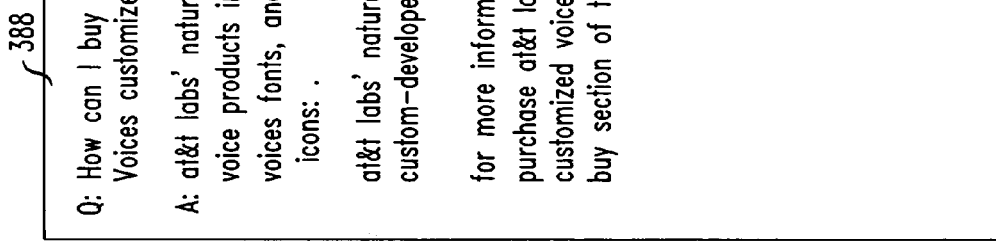
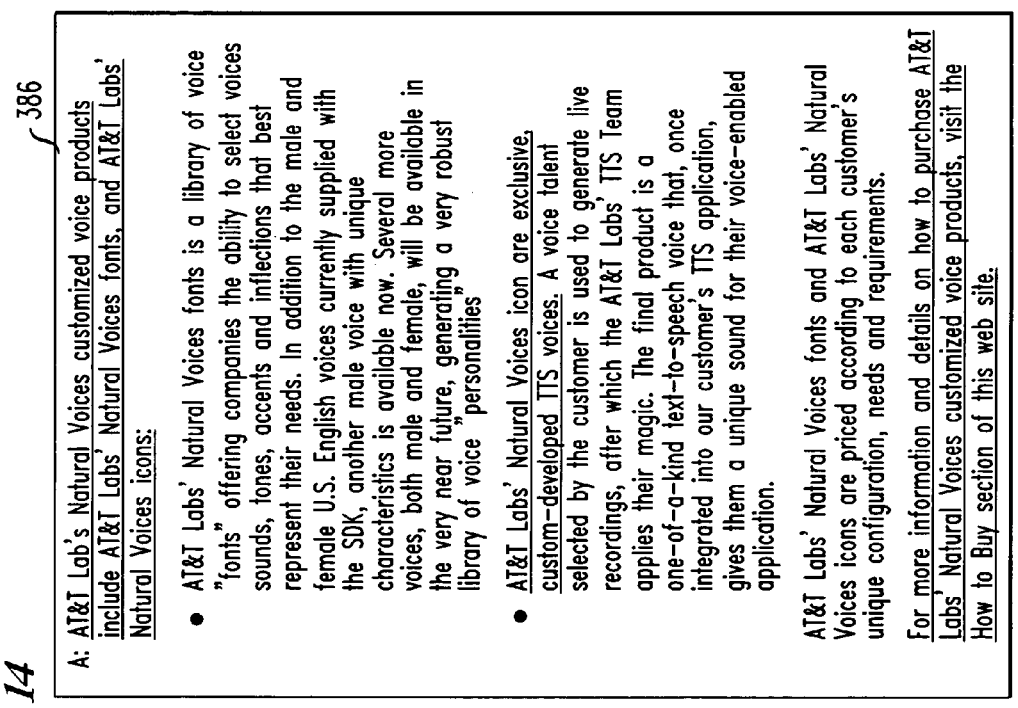
Fig. 14

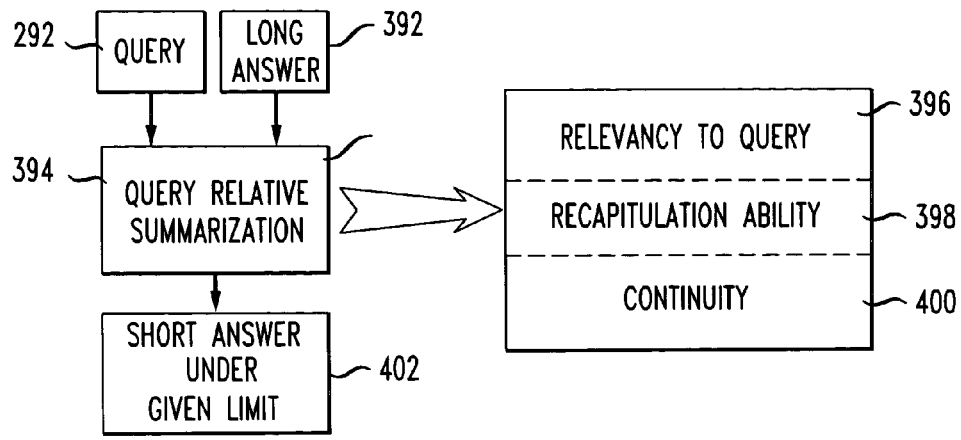
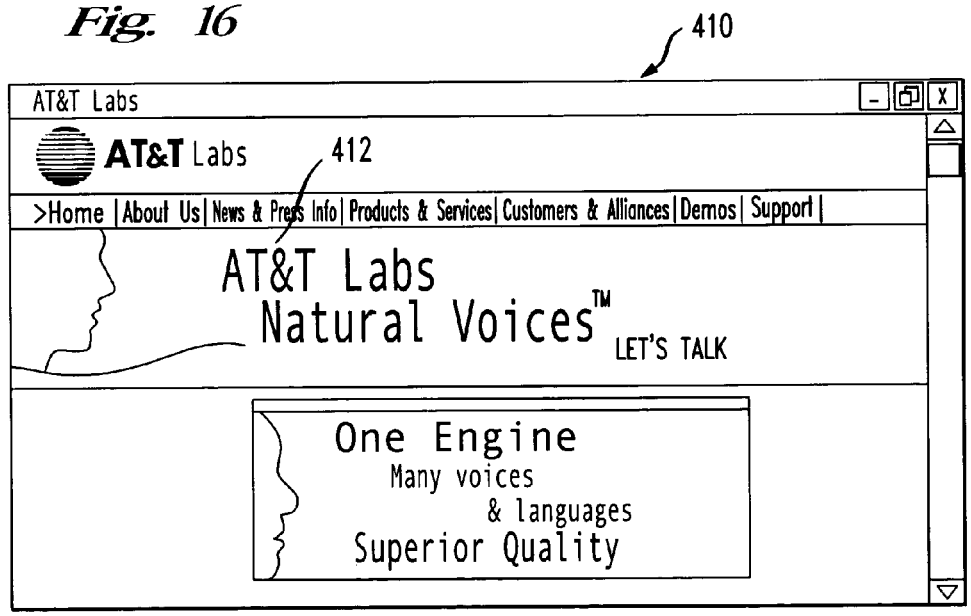
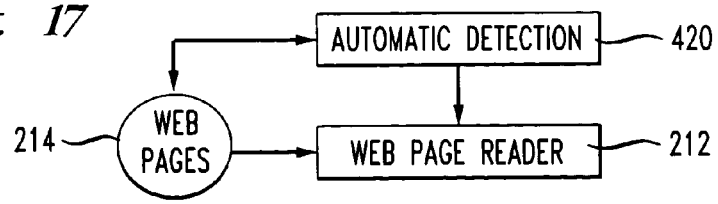

— 1 —

SYSTEM AND METHOD OF AUTOMATING A SPOKEN DIALOGUE SERVICE

PRIORITY DOCUMENT

The present application is a continuation-in-part of U.S. patent application Ser. No. 10/160,461, filed May 31, 2002, now U.S. Pat. No. 7,152,029. issued Dec. 19, 2006, and provisional application No. 60/368,640 filed Mar. 28, 2002. The contents of both applications are incorporated herein by reference.

BACKGROUND OF THE INVENTION

1. Field of the Invention

The present invention relates to spoken dialog systems and more specifically to a system and method of automating the development of web-based spoken dialog systems.

2. Discussion of Related Art

Spoken dialog systems provide individuals and companies with a cost-effective means of communicating with customers. For example, a spoken dialog system can be deployed as part of a telephone service that enables users to call in and talk with the computer system to receive billing information or other telephone service-related information. In order for the computer system to understand the words spoken by the user, a process of generating data and training recognition grammars is necessary. The resulting grammars generated from the training process enable the spoken dialog system to accurately recognize words spoken within the "domain" that it expects. For example, the telephone service spoken dialog system will expect questions and inquiries about subject matter associated with the user's phone service. Developing such spoken dialog systems is a labor-intensive process that can take many human developers months to complete.

Many companies desire a voice interface with the company web-site. The prevalent method of creating such a spoken dialog service requires a handcrafted process of using data as well as human knowledge to manually create a task representation model that is further used for the general dialog infrastructure. Several approaches are currently used to create the dialog such as using VoiceXML, described below, and handcrafting a spoken dialog system, discussed next.

The general process of creating a handcrafted spoken dialog service is illustrated in FIG. 1. The process requires a database of information and human task knowledge (102). For example, to provide a voice interface to a web-site, human interaction is required to review the text of the web-site and manually assign parameters to the text in order to train the various automatic speech recognition, natural language understanding, dialog management and text-to-speech modules in a spoken dialog system.

A typical spoken dialog system includes the general components or modules illustrated in FIG. 2. The spoken dialog system 110 may operate on a single computing device or on a distributed computer network. The system 110 receives speech sounds from a user 112 and operates to generate a response. The general components of such a system include an automatic speech recognition ("ASR") module 114 that recognizes the words spoken by the user 112. A spoken language understanding ("SLU") module 116 associates a meaning to the words received from the ASR 114. A dialog management ("DM") module 118 manages the dialog by determining an appropriate response to the customer question. Based on the determined action, a language generation ("LG") module 120 generates the appropriate words to be spoken by the system in response and a Text-to-Speech ("TTS") module 122 synthesizes the speech for the user 112.

Returning to FIG. 1, the "domain" related to the subject matter of the web-site and the modules must be trained in order to provide a spoken dialog that is sufficiently error-free to be acceptable. The handcrafted process results in a task representation model (104) that is then used to generate the dialog infrastructure (106).

Once a design team completes the spoken dialog system for a particular web-site, the system is complete and "static." That is, the system is up-to-date for the current status of the products, services, and information contained on the company web-site at the time the system is deployed. However, if a new product or services offering is added to the web-site, the company must update the spoken dialog system since the "domain" of information is now different. Humans must then again review the updated web-site and provide the further information and parameters to the spoken dialog system to keep it up to date. This process can quickly become expensive beyond the initial development phase to keep the spoken dialog system current.

The difficulty with the training component of deploying a spoken dialog system is that the cost and time required precludes some companies from participating in the service. The cost may keep smaller companies from seeking this money-saving service. Larger companies may be hindered from employing such a service because of the delay required to prepare the system.

As mentioned above, another attempt at providing a voice interface to a web-site is VoiceXML (Voice Extensible Markup Language). VoiceXML is designed for creating audio dialogs that feature synthesized speech, digitized audio, recognition of spoken and DTMF key input, recording of spoken input, telephony, and mixed-initiative conversations. Its major goal is to bring the advantages of web-based development and content delivery to interactive voice response applications. However, VoiceXML requires programming each user interaction. FIG. 3 illustrates a portion of the source code for a Voice XML dialog. Using the source code of FIG. 3, the following dialog can occur:

C (computer): Would you like coffee, tea, milk, or nothing?
H (human): Orange juice.
C: I did not understand what you said.
C: Would you like coffee, tea, milk, or nothing?
H: Tea
C: (continues dialog . . . ).

Such a VoiceXML dialog must be programmed by the web programmer and any update to the web-site, such as a new product offering, will also require reprogramming to synchronize and bring the spoken dialog interaction up to date. Therefore, the VoiceXML programming language suffers from the same difficulties as does the standard method of generating a spoken dialog system in that it is costly to program and costly to keep the voice interface up-to-date as web-site content changes.

Other task representation models include an object-based model (discussed in: Abella, A. and Gorin, A. L., "Construct algebra: Analytical dialog management", *Proc. ACL*, Washington, D.C., 20-26, Jun. 1999), a table-based model (discussed in Roberto Pieraccinib, Esther Levin, Wieland Eckert, "AMICA: the AT&T Mixed Initiative Conversational Architecture", *EuroSpeech97*, Vol. 4, pp 1875-1878 (1997)) and a script-based model (discussed in Xu, W. and Rudnicky, A, "Task-based dialog management using an agenda", *ANLP/NAACL* 2000 *Workshop on Conversational Systems*, May 2000, pp. 42-4). Within these frameworks, application authors are required to carefully define the relationships that exist in the task knowledge and predict all possible dialog states. However, experience has shown that application logics usually go beyond the scope that the generic dialog infrastructure and task representation model can cover. Even if a perfect generic dialog infrastructure and the associated efficient task representation model can be found, collecting task data, analyzing it and tailoring the data into these models still remain laborious and require tremendous expertise. This is also a crucial bottleneck for speech, natural language and dialog technologies to make contributions to wide applications.

Other attempts at providing a dialog access to web-site data is provided by a company called Soliloquy. Soliloquy provides a product called a "dialog expert" that enables customers to ask about what information, products or services a company provides. The product provides a dialog exchange that helps the customer to receive information about the company. Soliloquy attempts to provide a natural language dialog on a web-site as if the customer were talking with a real person. While Soliloquy's dialog experts provide some interaction with the user, there are many limitations on its use.

First, Soliloquy's dialog expert uses a table search method. In this method, a table of potential answers to questions is created as well as keywords that may be used to trigger the answer to those questions. Such systems are handcrafted and, as such, they require time and money to generate the dialog expert.

Further, if a company using Soliloquy's product wanted to update the information related to the dialog expert, the tables that are searched when communicating with an end user would have to be updated and the dialog expert updated as well. This is a costly and lengthy process that can reduce the profitability of using the service if products continually are added and dropped.

Another service at www.internetspeech.com provides some speech capabilities to web-sites. This service enables a user to call a telephone number and, through a voice dialog, navigate the Internet. The dialog process may be as follows, after entering an account number and PIN number:

Computer: Welcome to NetEcho. Please select from the following menu by saying "that one" or the category name: surf the net . . . web search . . . stock quote . . . my email . . . today's news . . . more options . . . enable link . . . .

Person: That one (user says after the computer says "enable link" to select "enable link").

Computer: Link mode is enabled. Main menu, please select from the following menu: . . . surf the net . . . popular web-sites . . . .

User: Surf the net.

Computer: To go to our popular web-site, say "popular web-site;" to go to bookmarked web-sites, say "bookmarked web-site."

User: Popular web-site.

Computer: Please say your popular web-site.

User: LHS

Computer: I think you said LHS.com, correct?

User: Yes

Computer: Thank you, I am going to LHS.com Company highlights. LHS introduces voice express version 5. Link. Their Dictaphone demonstrates call center solutions at first conference. Link. Internetspeech.com selects Lernout and Hauspie Text-to-Speech for its audio Internet product. Link.

User: That one.

Computer: Internetspeech.com, an audio internet service provider, today announced a licensing agreement with Lernout and Hauspie, seller of speech language products, technologies and services, to integrate Realspeak in their Netecho product . . . .

User: Stop.

The above dialog enables the user to obtain access to web-site content via the telephone. As is clear from the dialog, however, the user still must navigate a menu system. The computer identifies links to the user by stating paragraphs from a web-site and then stating "link." From this, the user may listen to headlines or statements associated with each link and then say "that one" to go to the linked information. While this method enables a user to get to web-site content, this process is cumbersome. For example, if a user desires to receive information that may be contained in the last paragraph of an article, the user must select links to get to an article and then listen to the entire article until getting to the desired information.

What is needed is a system and method of audibly navigating a web-site that enables a user to quickly receive web-site content. Further, what is needed is a system and method of quickly creating a spoken language dialog service for a web site that is also easily updated and maintained with less human intervention.

SUMMARY OF THE INVENTION

The present invention addresses the deficiencies in the prior art by introducing a method and tool for automatically deploying a spoken dialog service based on web-site content. This present invention leverages the powerful bank of knowledge in the world-wide-web with natural language processing technologies so that a company can easily integrate a customized voice-based dialog system to improve customer service and lower service cost. The present invention reduces the need for the labor-intensive handcrafted process to generate the dialog service.

The invention enables a company or an entity to automatically, without human intervention or with very little human intervention, and using the prior knowledge contained in a company web-site or elsewhere, to deploy a spoken dialog service. An advantage of the present invention is to reduce or eliminate the need for human interaction in the training and development phase of a spoken dialog system. In this manner, the present invention represents cost and time-savings in the process of deploying such spoken dialog systems.

A further advantage of the invention is that when a company's web-site data is updated, the spoken dialog service can also be automatically updated to maintain a high level of language recognition and understanding from the user. In this manner, the invention more quickly and easily synchronizes company information to the dialog service. Therefore, when web-site content is updated, the invention essentially eliminates the need for human intervention to synchronize the spoken dialog service.

Another advantage of the present invention is that it enables the spoken dialog service to be deployed by leveraging the wealth of data on the world-wide-web.

Another advantage of the present invention is to enable more complex dialog services for companies without the need to reprogram each interactive dialog as would be required with VoiceXML.

An embodiment of the present invention relates to a method of creating a spoken dialog system based on data from a web-site. The method comprises receiving task knowledge from data in the web-site, automatically generating a task-oriented dialog model based on the web-site data, and generating the spoken dialog system based on the task-oriented dialog model. Generating the task-oriented dialog model may involve a web-page reader module that comprises features such as an HTML parser, a relevant text extractor and a document relationship extractor. This web-page reader module converts the raw data from the web-site into usable data for the various components (ASR, SLU, DM, etc.) that make up the spoken dialog system.

Another embodiment of the invention relates to a system and method of synchronizing a spoken dialog system associated with a web-site wherein the system automatically detects when new information is added to the web-site. The additional information is processed and integrated with the previous web-site data in order to automatically synchronize the spoken dialog system with the additional web-site information.

BRIEF DESCRIPTION OF THE DRAWINGS

The foregoing advantages of the present invention will be apparent from the following detailed description of several embodiments of the invention with reference to the corresponding accompanying drawings, in which:

FIG. 1 illustrates a prior art handcrafted process of generating a spoken dialog service;

FIG. 2 illustrates the general components associated with a spoken dialog service;

FIG. 5B illustrates the processed news web-page of FIG. 5A;

FIG. 14 shows an example of web-page data and a spoken language understanding of a question and a response drawn from the web-page data;

FIG. 15 illustrates a query relative summarization process;

FIG. 16 shows an example web-page from which answers are drawn for the spoken language dialog; and FIG. 17 illustrates an automatic detection system that synchronizes the spoken dialog system with web-site updates.

DETAILED DESCRIPTION OF THE INVENTION

Figures 3, 4:
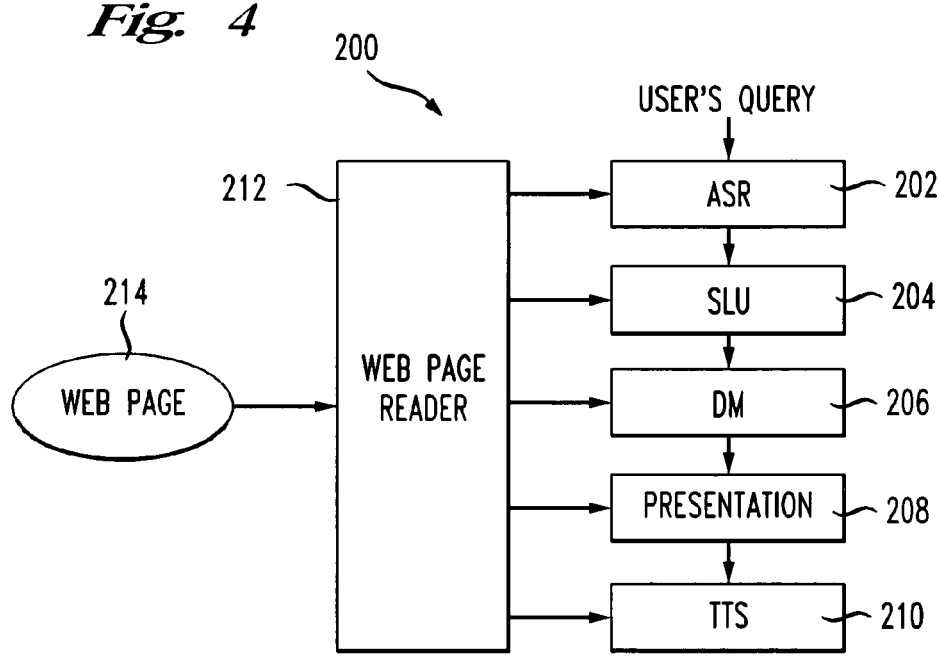
FIG. 3 illustrates examples of prior art VoiceXML source code.
FIG. 4 shows an exemplary system architecture for an embodiment of the present invention.

The present invention relates to improved tools, infrastructure and processes for rapidly prototyping a natural language dialog service. A computer system may process some or all of the steps recited in the claims. Those of ordinary skill in the art will understand whether the steps can occur on a single computing device, such as a personal computer having a Pentium central processing unit, or whether some or all of the steps occur on various computer devices distributed in a network. The computer device or devices will function according to software instructions provided in accordance with the principles of the invention. As will become clear in the description below, the physical location of where various steps in the methods occur is irrelevant to the substance of the invention disclosed herein.

The important aspect of the invention relates to the method of using existing data associated within a web-site of a company, to rapidly deploy a spoken dialog system having acceptable accuracy rates for the domain of information and conversation associated with the enterprise. Accordingly, as used herein, the term "the system" will refer to any computer device or devices that are programmed to function and process the steps of the method.

Similarly, another aspect of the invention is a spoken dialog system generated according to the method disclosed herein. While the components of such a system will be described, the physical location of the various components may reside on a single computing device, or on various computing devices communicating through a wireline or wireless communication means. Computing devices continually improve and those of skill in the art will readily understand the types and configurations of computing devices upon which the spoken dialog system created according to the present invention will operate.

When preparing a web-site, a company invests a great deal of effort in analyzing the application database, extracting application logics, and carefully designing the screen presentation to make it more attractive and helpful for the customers and consumers. Passages on the web come from the integration of task databases and task knowledge in human minds. Most texts are organized in natural language. Hence, web data is much closer to natural language-based dialog services than the supporting database.

The present invention enables the construction of dialog services with little or zero human intervention. Since no human intervention is required to develop the initial system, the system can generate quick and automatic updates from one application to another, and can synchronize a system with the updates of the associated web-site immediately. Thus, the system enables more complex dialog services and dramatically spreads the use of natural language (NL) technologies.

The present invention may be deployed as a voice-enabled help-desk service for a company or a company web-site, customer care services and NL-based Web Navigation. Other uses of the present invention may also exist beyond the general voice-enabled web-site. For example, if a product typically ships with detailed instructions for building the product, such as a bicycle or a toy, an electronic device may accompany the product to provide a spoken dialog system that can answer questions and provide instructions on how to assemble the product. The present invention will work for any corpus of data.

Accomplishing the goals of the present invention involves advances in technologies across speech, language processing, and dialog management. The present invention includes improvements to the basic components of a spoken dialog system as shown in FIG. 2. These improvements include: (1) For the ASR, constructing language models that reflect human-machine interaction through using web data alone; (2) for the NLU, building natural language understanding models that require no hand-editing or annotation; (3) for the DM, constructing application-specific dialog models based on unstructured and structured task data on web-sites; and (4) for the TTS, designing a language generation component in a manner that can intelligently present the system's knowledge state, and building a web-based task-oriented TTS component with good quality.

A simplified architecture of an embodiment of the invention is shown in FIG. 4. It contains six major components of the spoken dialog system 200, namely, the ASR engine 202, the SLU module 204, the DM 206, language presentation component 208, the TTS synthesizer 210, the web-page reader 212 and the source of the data, the web-page 214. The architecture of the present invention supports complete automation for building spoken dialog systems based on a given customer-care web-site. Hence, each component is required to work automatically based on web data.

The present invention differs from the internetspeech.com since that system does not contain any web-site understanding, dialog management, natural language understanding or language generation components. That system is basically a command-based accessing tool. The present invention provides many improvements and capabilities to receive direct answers to questions.

Web documents could be written with HTML (Hypertext Markup language), XML (Extensible Markup Language), or VRML (Voice Extensible Markup Language), the programming details of which are known to those of skill in the art. Each document specifies a set of elements and attributes to govern the document structure, visual presentation, and users' interactivity with the document. With these specifications, a web author presents task knowledge and knowledge relationship according to human understanding conventions. Web-page reader 214 accepts a set of web-pages and returns a structured task knowledge representation. The structured task knowledge obtained from the web-page reader 212 will be fed into each of other components shown in FIG. 4. The web-page reader 212 extracts text, and relationships among them, from HyperText Markup Language (HTML) files and represents them in a more structured format.

Web documents enclose all texts in a hierarchy of tags that determine the appearance, attributes, functionalities, importance, degrees and mutual relationship of text within the web-page. Though different web authors have very different strategies to show their intentions, common principles behind these varieties still exist. The web-page reader 212 takes advantage of these parameters within web-site content. A list of rules concerning how to identify text functions and their relationship according to their attributes is developed.

An example of how the list of rules may be developed follows. Each unit of text or text segment from a web-page is represented with 7 features: (1) structure_code, (2) tag, (3) parent_tag, (4) text, (5) color, (6) size, and (7) link. Appendix A provides an example set of a plurality of parameters or list of rules for a web-site. The Appendix illustrates how one may organize the web-site content. Other ways and parameters may be used as well.

Web data has many properties and an aspect of the present invention is to classify them into preferably seven types. The particular group or number of features discussed by way of example herein is not critical to the invention. Other features or organization of the extracted web-page data may be employed. These rules are implemented by hand but can be generalized across a variety of web-pages. Other parameters may be developed to further refine the types and classifications of web text. The following example illustrates the point.

The first step may comprise extracting three consequent text segments T1, T2, T3 from a web-page. The three text segments are represented in the following form:

T1 (color=red, hp=5, vp=7, size=6, wc=7, link=NULL)
T2 (color=black, hp=5, vp=9, size=2, wc=30, link=NULL)
T3 (color=black, hp=5, vp=10, size=2, wc=40, link=NULL)

Figure 5A:
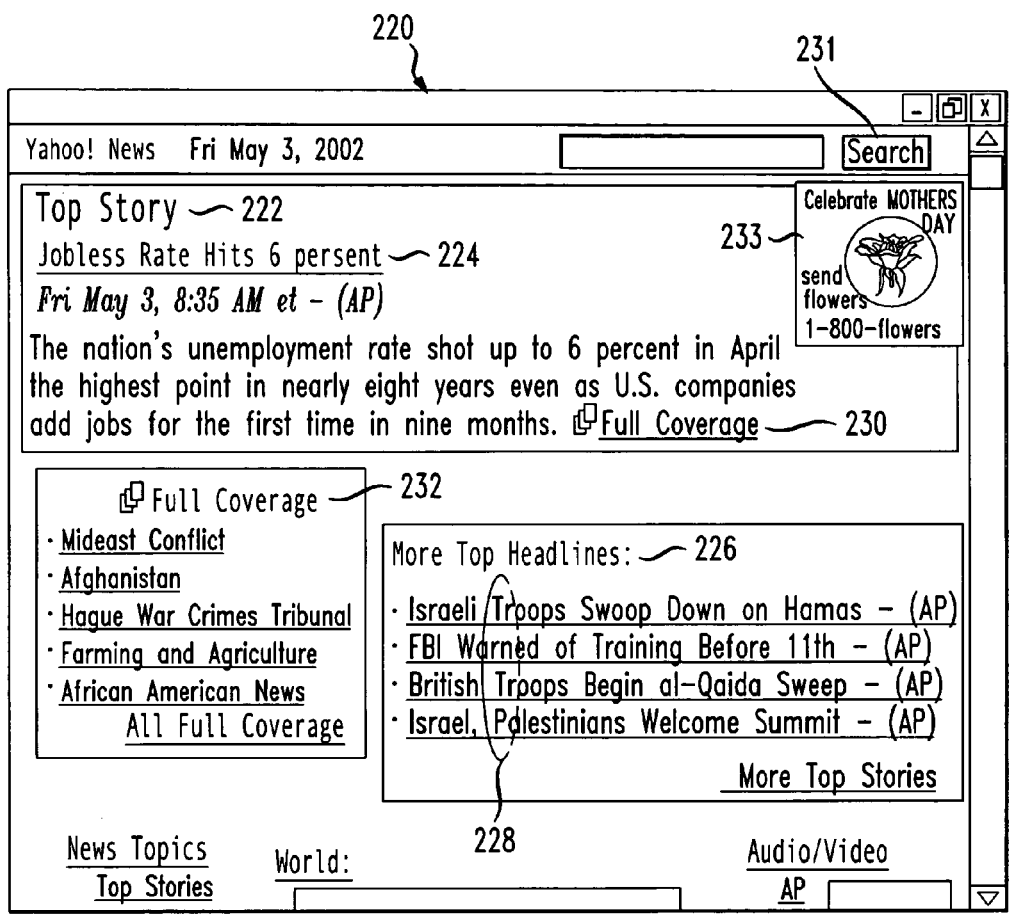
FIG. 5A illustrates a news-oriented web-page.

Then, themes for the content pairs are identified represented in the form of topic-content pairs: Topic: T1; Content: T2, T3. FIG. 5A provides an example of a web-page 220 (Yahoo® News) having text and links to other web-pages. The illustrated text includes "Top Story" 222 with the headline "Jobless Rate Hits 6 Percent" 224 including a link to "Full Coverage" 230. Other topics include "More Top Headlines" 226 with the respective listing of headline stories 228 and a "Full Coverage" 232 section.

FIG. 5B illustrates the extraction of the various text segments and links in the web-page 220 of FIG. 5A. The format of the extracted text is represented as follows:

<T:> topic/question</T>
<L:>hyper-links in topic in a format "A_text_:_A_link_text_:_" </L>
<A> content/answer</A>
<L:> Associated hyperlink </L>

Accordingly, in FIG. 5B, data set 234 for the title "Yahoo! News" lists the text "Yahoo! News" as a topic or question but with no answer content, links within the text or links associated with the text. Data set 236 includes content or an answer (the date of "Friday, May 3, 2002") associated with the topic "Yahoo! News" but no topic internal or associated hyperlinks. Data set 238 relates to the "Full Coverage" section 232 of FIG. 5A and includes as the content/answer the titles of the articles: "Mid-East Conflict, Afghanistan, Hague War Crimes Tribunal, Framing and Agriculture, African American News." No associated links or topic internal links are shown in this data set 238.

Data set 240 is for the article "Jobless Rate Hits 6 Percent" and includes text as content/answer data including the date and time and the brief summary of the story. An associated link (230 in FIG. 5A) is shown in data set 240 to a web-page with the full story. Data set 242 provides another set of extracted data for the "More Top Headlines" 226 section of the web-page 220. Thus, FIG. 5B provides an example of how the web-page reader 212 processes web-page text.

Figure 6:
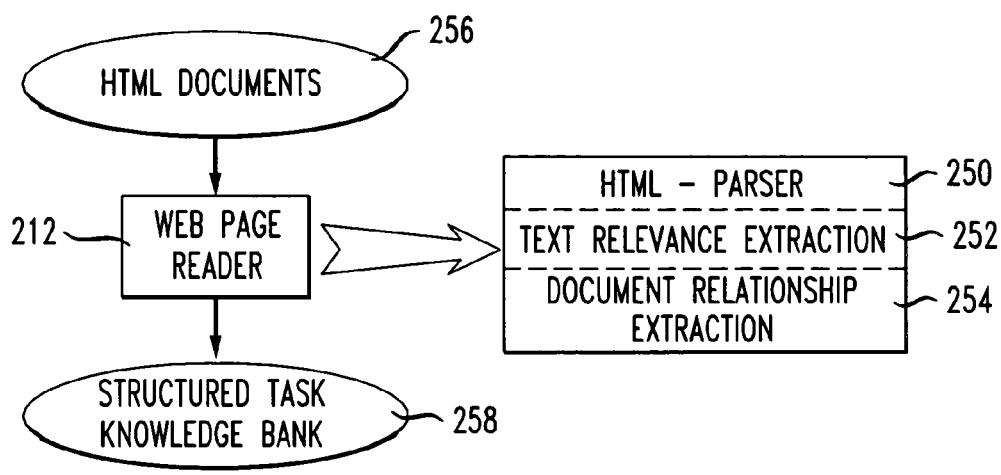
FIG. 6 illustrates the general tasks associated with the web-page reader.

Further tasks for the web-page reader 212 include integrating thematically coherent text segments or natural paragraphs into a topic, finding a hierarchical relationship between them, deleting redundant information, and filtering out non-useful data. The web-page reader 212 prepares task data for other components, particularly for the DM 206 and SLU 204. FIG. 6 illustrates the general tasks associated with the web-page reader 212. The web-page reader 212 receives HTML documents 256 and performs the functions of parsing the HTML documents 250, extracting relevant text from the documents 252 and extracting a relationship between text and/or web-pages within the set of HTML documents 254. The information from the web-page reader 212 is transmitted into a structured Task Knowledge Bank 258 for use in generating dialog models.

Figure 7:
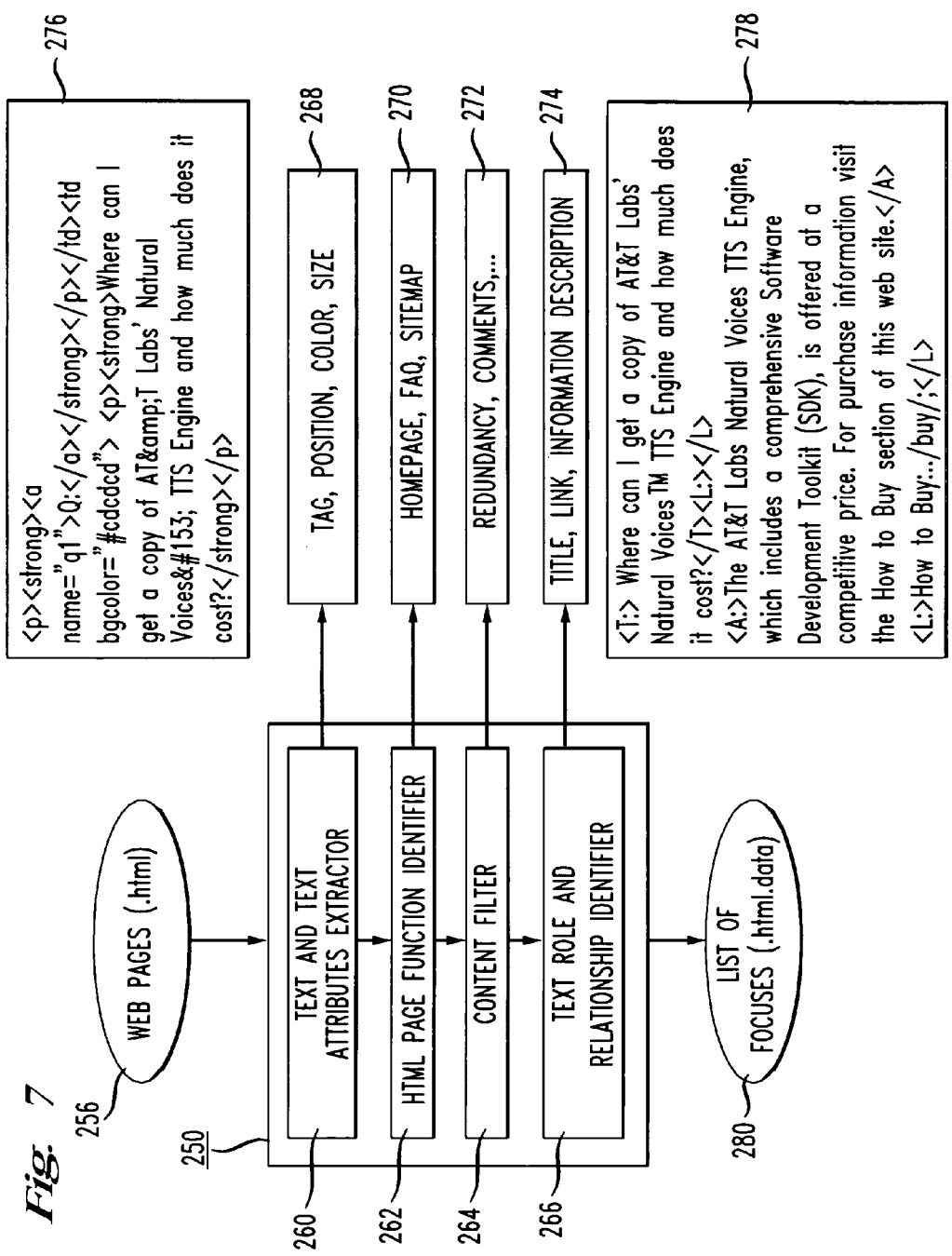
FIG. 7 illustrates an example web-site parser associated with the web-page reader.

Different classification, parsing and organization routines may be applied for web-page data presented in the different formats of HTML, XML or VRML. FIG. 7 illustrates an example web-site parser 250 associated with the web-page reader 212. The web-page parser 250 receives and processes a set of web-pages (HTML in this example) 256. A text and text attributes extractor 260 extracts the tags, position, color, size, and perhaps other parameters associated with the text 268. An HTML page function identifier 262 identifies whether the respective page is a homepage, frequently asked questions (faq) page or a sitemap 270. Of course, other web-page function identifiers are possible and only a few examples are provided. A content filter 264 reduces redundancy and analyzes the text or text segments for its content 272. A text role and relationship identifier module 266 determines what the particular text or text segment is, such as a title, a link to another web-site, or information 274. The output of the web-site parser 250 is data stored in a file such as a ".html.data" file 280 having a list of focuses associated with a particular web-page. Box 276 illustrates data from a set of web-pages within a .html file. Box 278 illustrates the processed .html file showing parsed information prepared for integration with the spoken dialog system. The "<T:>" labels refer to topic or information related to a question the user may ask. The "<A:>" labels refer to web-page data that provides content or text from which a response to a user question is generated. The "</L>" labels refer to links within the text or associated with text on a web-page.

The inventors prefer using a task-oriented ASR component instead of a task-independent large vocabulary speech decoder component in order to obtain high recognition performance. A task-specific language model is built using only data available on the web. Web-pages are typically prepared for humans to read and contain information in descriptive form. One of the realities the present invention addresses is the lack of real examples of how human-machine interaction proceeds within a given task associated with a web-site. Hence, the challenge is to compensate for the absence of real human-machine dialogs and learn a language model that better reflects the characteristics of human-machine interactions.

Figure 8:
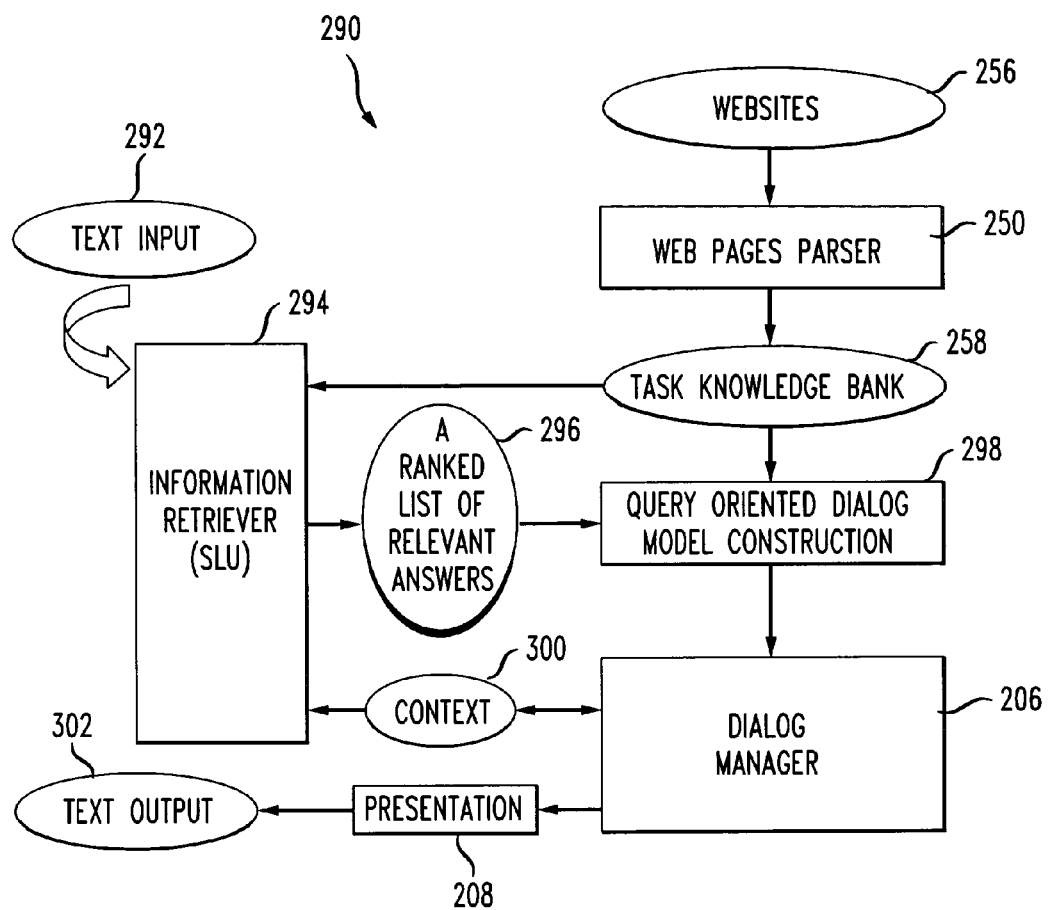
FIG. 8 illustrates the operation of the information retrieval process in the context of the spoken dialog system.

Traditionally, the SLU 204 is rule-based and converts natural language sentences into semantic representation. When developing a new spoken dialog service for a company, the traditional approach involves building the set of handcrafted rules and relies on deep task analysis and special expertise. However, in the architecture of the present invention, the SLU 204 works automatically to be adaptable for various tasks based on the given web data and is not expected to have the same functions as it usually does. The SLU component 204 according to the present invention is data-driven rather than rules-based. The system implements the SLU 204 using significant algorithms in a standard information retriever (IR). Given a user's query, it produces a ranked list of relevant topics as possible solutions. The data-driven SLU 204 applies a Vector Space Model used in Information Retrieval (IR) algorithms. See, e.g., R. D. Sharp, E. Bocchieri, C. Castillo, S. Parthasarathy, C. Rath, M. Riley, and J. Rowland, "The Watson Speech Recognition Engine," *Proc. Int. Conf. Acoustic, Speech, Signal Processing*, pages 4065-4068 (1997). Complex natural language parsing techniques are integrated into this component. FIG. 8 illustrates the operation of the information retrieval process in the context of the spoken dialog system. A web dialog can occur using the system 290 shown in FIG. 8. Text input 292 from either an ASR module 202 or another source is input to an information retrieval (IR) module 294. The information retrieval module relates to the SLU 204 that receives a user's query and outputs a ranked list of possible solutions or answers 296 for use by the DM 206. As previously discussed, web-site data 256 is processed by the web-page parser 250 to generate data in a task knowledge bank 258. The task knowledge bank 258 communicates data to the information retriever 294 to participate in generating the list of relevant answers 296. The data from the task knowledge bank 258 is also made available to a query-oriented dialog model construction module 298. The module 298 uses the list of relevant answers 296 and the task knowledge bank 258 to provide input to the dialog manager 206 in order to properly generate a response. The dialog manager 206 also communicates the context 300 of the input text 292 to the information retrieval module 294. In this manner, the context of a current dialog or conversation between the user and the system can provide better and more context-relevant communication. For example, if a user discusses product-1 in the dialog history and then asks "How to buy" at some point in the dialog, the DM 206 can reasonably extend the user's intention to be "How to buy product-1" and inform the IR module 294 to work on "how to buy product-1" instead of "how to buy all products". The dialog manager 206 then provides output to the presentation module 208 for producing text output 302 for display on a web-site or elsewhere or for further processing by a text-to-speech (TTS) module 210 (not shown).

Figure 9:
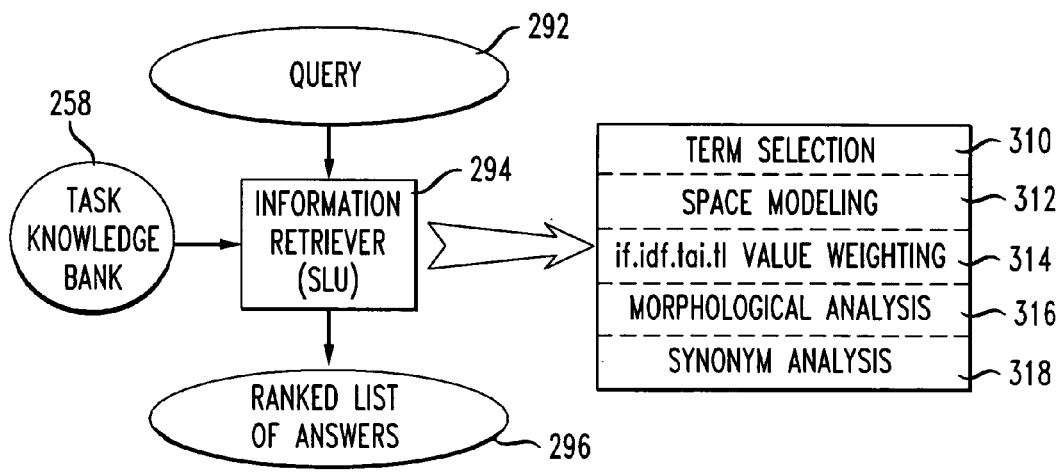
FIG. 9 illustrates details regarding an example spoken language understanding module.

More details regarding the IR 294 are shown by way of example in FIG. 9. In this example, the system receives a query (such as text input) 292 from a user that is submitted to the IR 294. The IR 294 receives data from the task knowledge bank 258 and performs a process of term selection 310, vector space modeling 312, weighting of values 314, morphological analysis 316, and synonym analysis 318. The output from the IR 294 is a ranked list of answers 296 to the query 292.

An IR vector space model may be ported to the architecture. As an example of one of many ways of applying vector space modeling, with the IP vector space model, each topic and query is represented with a vector as shown in formula (1). Each vector element corresponds to a salient word or phrase, which is called a "term" in the following:

$$\vec{d}_j = (w_{1j}, w_{2j}, \ldots w_{M,j})$$

Figure 10:
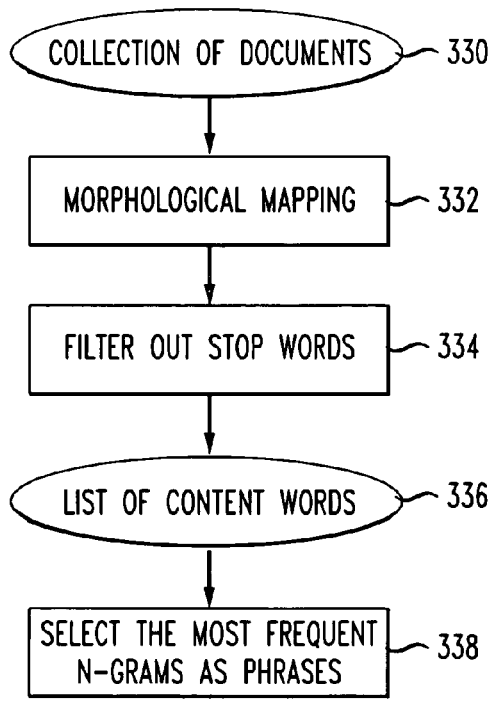
FIG. 10 illustrates a method of content term selection associated with the spoken language understanding module.

FIG. 10 illustrates a method of selecting a content term that is associated with the term selection 310 function of the IR 294 referenced in FIG. 9. For choosing terms for a spoken dialog application, the system maps each word in the web-site collection of documents (330) to its basic form through a generic English morphological table (332). The system filters out stop words such as "the", "from" and "could" (334). Stop words are grammatical or function words that are very common and rarely contribute task-dependent information. The result is a list of content words (336). From the list of content words, the system selects the most frequent n-grams as phrases (338). See, e.g., X. Huang, A. Acero, and H. Hon, *Spoken Language Processing*, Prentice Hall PRT (2001), pages 558-560. The words and phases are combined together as the vector dimensions.

Each term extracted from a web-site 256 is not equally important to a task. Accordingly, formula (2) weights the vector defined in formula (1) and use four factors for its weighting process.

$$w_{ij} = \begin{cases} (1 + \log(tf_{ij} \cdot tai_{i,J} \cdot \sqrt{tl_i}))\log\frac{N}{df_i} & tf_{i,j} \geq 1 \\ 0 & tf_{i,J=0} \end{cases} \quad (2)$$

The four factors used in formula (2) include: term frequency (tf), inverse document frequency (idf=log N/df$_1$), term appearance importance (tai) scored from HTML tag attributes and the length of term (tl). Variables stand for the following: tf$_{i,J}$: term frequency for term i in paragraph j; tai$_{i,J}$: appearance importance of term i in paragraph j; tl$_1$: number of words in term i; df$_1$: document frequency of term i; N: the total number of documents in the web-site; and M: the total number of terms. Other means of assigning weights to the various words in the web-page may also be employed.

Standard IR traditionally uses tf.idf to weight term vectors. The similarity between two vectors is measured by the cosine in formula (3).

$$\cos(\vec{q}, \vec{d}) = \frac{\sum_{i=1}^{n} q_i d_i}{\sqrt{\sum_{i=1}^{n} q_i^2} \sqrt{\sum_{i=1}^{n} d_i^2}} \quad (3)$$

The variable q is the query vector and d is a document vector. The cosine value is introduced as a measure of vector similarity, where q and d are n-dimensional vectors in a real-value space. Documents can be ranked according to similarity with the query. In an aspect of the invention, the system uses cosine and Euclidean distances that give rise to the same ranking for normalized vectors. In addition, when comparing two vectors, synonym relationship between two terms is taken into account. Based on the similarity score from equation (3) that compares the query vector q to the document vector d, the relevant passages are ranked.

Although the present invention uses some of the principles of IR, it provides a broader range of processes. For example, in traditional IR, the document received is viewed as an unstructured set of words whereas with the present invention the text and text relationship are analyzed in preparation for building a dialog model. In IR, the user's query is context-independent whereas in the present invention the user's query is context-dependent. Further, the output from an IR process is a ranked list of documents whereas with the present invention the output is a dialog model that can be used to converse with the user. Traditional IR matching requires a system to extract meaning from the user's query using a term index table and a synonym table. The IR system then uses a document vector to generate a vector similarity measure resulting in a ranked list of documents related to the user's query.

Figure 12:
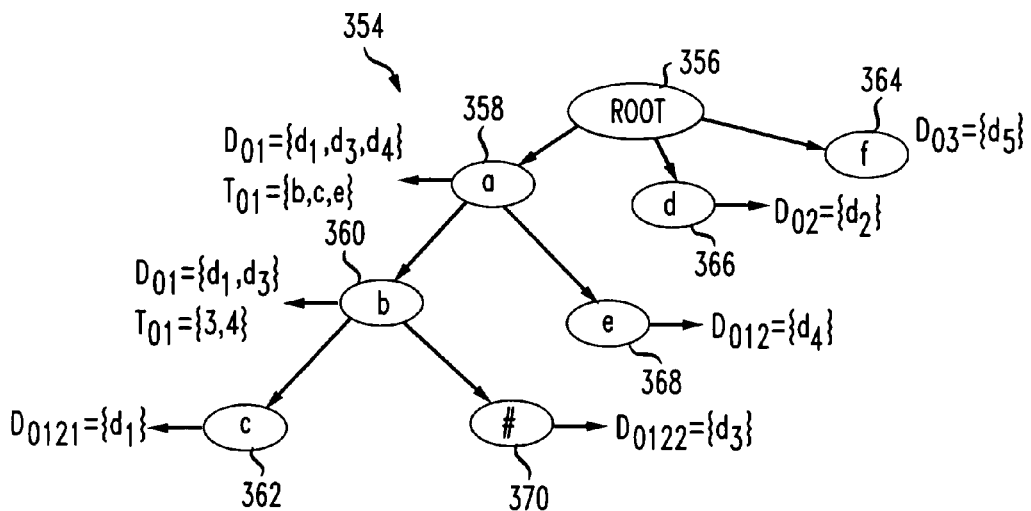
FIG. 12 shows an exemplary discrimination tree generated by the dialog model constructor.

Referring again to FIG. 8, the Dialog Manager (DM) 206 is the center of a dialog system and at the same time a component that currently involves the most handcrafted work. Developing the DM 206 is labor-intensive due to the requirement of predicting all possible dialog states and designing associated functions or feedbacks for each state. In order to automatically construct this component, the present invention involves converting task knowledge 258 described in web documents into operable dialog models 298. For each user's query, based on the output of IR 294, the system builds a query-dependent hierarchy tree 354 as shown in FIG. 12. This hierarchy tree determines the system's dialog actions.

Figure 11:
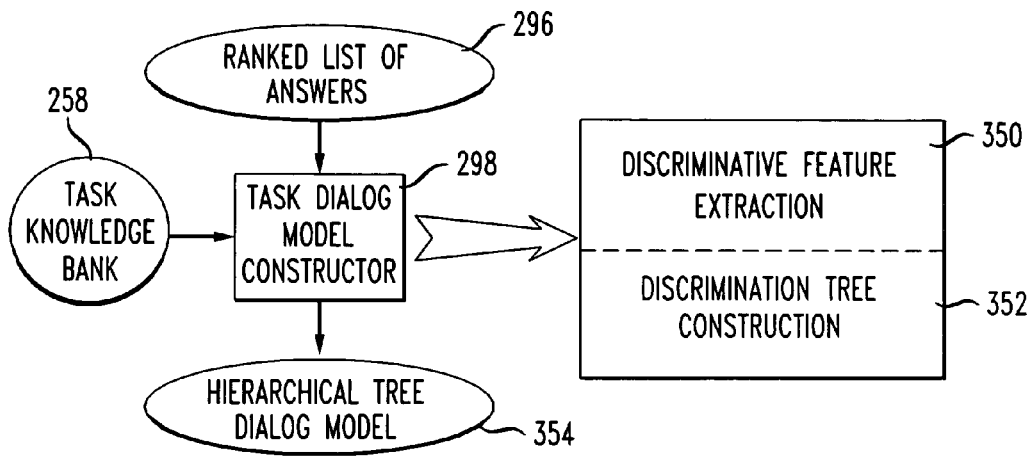
FIG. 11 illustrates a query-oriented task dialog model constructor.

The improved DM 206 of the present invention enables constructing appropriate task dialog models in real-time based on the user's query and dialog context. This model may be referred to as the query-oriented dialog model 298 and is designed in a tree form where each node corresponds to a group of solutions and a list of discriminative features. Based on the hierarchy tree, the system can initiate a disambiguation dialog to negotiate with the user to move forward to the next turn. This tree is also used to assemble the system's current knowledge state. FIG. 11 illustrates the interaction of the task dialog model constructor 298 with the task knowledge bank 258 and the ranked list of answers 296. The task dialog model constructor 298 receives data from the ranked list of answers 296 and the task knowledge bank 258 to perform a discriminative feature extraction process 350 and a discrimination tree construction process 352. The result is a hierarchical tree dialog model 354, discussed further in FIG. 12. FIG. 12 illustrates a simple example of the process. Based on a user's query 292 and a list of possible solutions 296, a dialog tree is built dynamically. When multiple relevant answers are found for a query, the responsibility of the dialog manager is to help the user get exactly what he or she needs. Telling differences between web-site data using disambiguation sub-dialog information is one way to accomplish this task. A dialog tree is designed to organize the answers into a hierarchical tree. On each node except the leaf node that corresponds to a specific document, the dialog manager can describe the difference between its son-nodes based on their discrimination features.

Assume a simple document collection D, which is defined as D={d1=(a,b,c), d2=(c,d), d3=(a,b), d4=(a,e), d5=(f)}. The term set for D is: T={a,b,c,d,e,f}. With a vector space model, each document is represented as a real-value vector with dimensions sequentially corresponding to the term: "a, b, c, d, e, f". D can be represented as:

D={
d1=(1,1,1,0,0,0),
d2=(0,0,1,1,0,0),
d3=(1,1,0,0,0,0),
d4=(1,0,0,0,0,1),
d5=(0,0,0,0,0,1)
}

Based on D, the module 298 outputs a resulting hierarchy tree that works as a dialog model, shown by way of example in FIG. 12. The motivation for this process of taking the ranking list of focuses or document 296 and generating a hierarchy tree 354 from module 298 is that usually multiple possible answers are relevant to a user's inquiry. This process provides answers and a disambiguation dialog provides a means to narrow the possible answers. The discrimination tree shown in FIG. 12 discriminates between possible answers and provides a top-down construction. Each node $n_k$ (358, 360, 362, 364, 366, 368, 370) in FIG. 12 includes four attributes: related documents (D), discriminative features from its sisters (F), a set of terms under consideration, and a set of shared terms (S). Therefore, $n_k$={D,F,T,S}.

Definitions for the hierarchy tree constructions include: (1) each node $n_k$ has four attributes: relevant document set (D), discriminative features (F), a set of terms under consideration (T), and a set of terms (S) shared by all sons of this node, hence, $n_k$={D,F,T,S}; (2) Times that term $t_1$ occurs in document $d_j$ is represented: $w_{1,j}$; (3) a set of documents which contain term $t_1$ is represented as $R(t_1)$; (4) the cardinal number of a set A is represented as C(A); (5) T(D) is a set of terms that D contains; and (6) the symbol "→" represents attributes. The top-down construction of the hierarchy tree 354 structure follows the steps set forth in the following psuedo code, wherein the input is a collection of documents represented as $D_0$={$d_1$, ... $d_j$ ... $d_J$} and a set of corresponding content terms $T_0$=T($D_0$)={$t_1$, ... $t_1$, ... $t_I$}:

1. Build root node (356) n={D=$D_0$, F=Ø, S={$t_1$, if ∀ $d_j$∈D, $w_{ij}$>0}, T=T-S};
2. D=n→D, T=n→T, t=0;
3. If C(D)=1 & C(T)>0, go to 4. Else Build son-nodes of n:
Choose a subset F'⊂T, F'={$t_1$, (i) $t_1$∈T, (ii) (R($t_1$))=max(C(R($t_1$))), for ∀ i∈T. (ii) for ∀ $t_1$, $t_j$∈F', R($t_1$)=R($t_j$)};
Build son-node n(t)={D',F',S',T'}, D'=R($t_1$), $t_j$∈F', S'={$t_j$, if ∀ $d_j$∈D, $w_{ij}$>0}, T=T∩T(D)-S-F};
D=n→D-n(t)→D, T=n→T-$n_t$→T-$n_t$→S, t=t+1, Go to 3;
4. For each son-node n(t) of n, let n=n(t), go to 2; and
5. End The root node 356 and the son-nodes are shown for node (a) 358, node (b) 360, node (c) 362, node (d) 366, node (e) 368, node (f) 364 and node (#) 370. As an example, from the top node 356, the dialog manager can tell the user discriminative features of its son-nodes. Discrimination features of a node are organized as a set of content terms, such as f={a}. When the dialog context is on node 356, the dialog manager can make a disambiguation question using {a} {d} {f}; then, based on the user's feedback, the dialog manager can determine where to go next.

Returning to FIG. 8, the function of the presentation component 208 goes beyond the standard language generation component. According to the present invention, all texts inside the system are prepared for users with web browsers and are not fit for playing in voice and dialog style. Hence, the system needs to translate these texts to a new version, applicable for spoken dialogs, to compress long passages and so on. Described herein is a more detailed description of the system having a query-relative summarization algorithm to address this issue.

The naturalness and intelligence of the system's prompts plays an important role in natural dialog interactions. Presentation relates directly to the user interface. In an aspect of the invention, an algorithm performs a query-relative summarization that chooses sentences from a big answer based on relevance with the query, references to summarization work, and continuity between them. Applying this approach, a long answer can be presented more concisely and pertinently to meet the user's needs.

Figure 13:
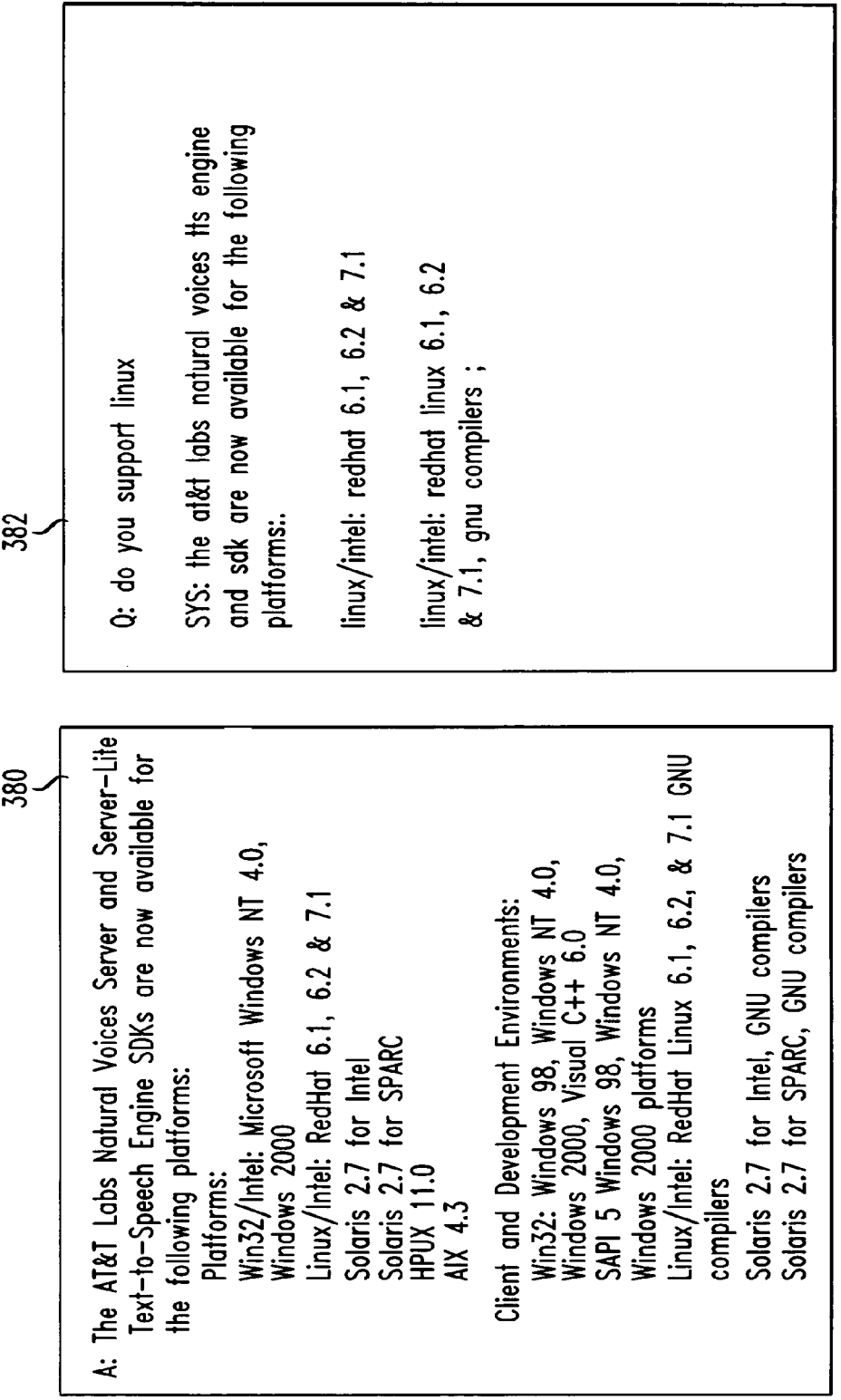
FIG. 13 provides an example of web-page text and a system's focused response to a user query drawn from the web-site text.

FIG. 13 illustrates the system interaction to a user question "What platforms do you support? Do you support Linux?" for the naturalvoices.com web-site. The boxed text 380 represents the text from a web-page associated with the web-site that answers the question or best answers the question. All of the text could be read to the user via the TTS 210 but such an answer would be too long and would include some irrelevant information. The boxed text 382 lists the spoken language understanding of the question as "Do you support Linux?" and sentences prepared by this approach for synthesizing using TTS 210. For example, the web-site may include information about platforms including HPUX 11.0, AIX 4.3 and Microsoft products; but in the response to the user that is generated via TTS, only the information related to Linux is presented to the user.

FIG. 14 provides another example of web-page information 386 for the question "How can I buy the AT&T Labs Natural Voices customized voice products, and how much do they cost?" The corresponding spoken language understanding and summarized synthesized response are also provided in 388. The spoken language understanding of the question results in "How can I buy the AT&T Labs Natural Voices customized voice products?" and the system's answer is illustrated which is a summary of the relevant web-site content. The underlined portions of the text in box 386 illustrate the summarized text delivered to the user in the dialog with the system.

As shown in FIG. 15, summarization of web-site content via the spoken dialog service involves finding a balance between the relevancy of web-site text to a query 292 and a potential long answer 392. A query relative summarization module 394 receives the query 292 and long answer 392, and in some cases a length limit, and analyzes the relevancy of the long answer to the query 396, the recapitulation ability 398 and the continuity 400. The result is a shorter answer according to certain parameters. In this manner, the summarization module 394 improves the dialog with the user by providing only relevant and important information from the web-site data.

Summarization involves determining a relevancy measure between a sentence s(k) within the web-site data to a user query q. The dialog service can provide a query-relative summarization via a tool such as a Q_Summary_Data_file that performs the necessary steps of the process. In general, the process involves receiving a user question, a long passage of text from the web-site and a length limit associated with the dialog service response. The object for a given question is to present a concise and pertinent answer from an identified web-site passage. A long answer that may comprise all the text of a passage is not applicable or appropriate for a spoken dialog. The query—relative summarization module 394 compresses the answer to meet the more normal voice interaction with the user.

The terms s(k) and q may be represented as a binary term vector, k=1 . . . K. In order to measure relevancy, the system preferably uses a vector space model. Sentences and queries are represented in a high-dimensional space, in which each dimension of the space corresponds to a salient word in the given passage. The following formula (4) is used as a measure of vector similarity. For a particular query q and a particular sentence $s^{(k)}$:

$$R(\vec{s}^{(k)}, \vec{q}) = \frac{\sum_{i=1}^{N} q_i s_i^{(k)}}{\sum_{i=1}^{N} q_i s_t^{(k)} + \sum_{i=1}^{N} |(1-q_i)| s_t^{(k)}} \tag{4}$$

where both of the following are N-dimensional binary vectors:

$$\vec{q} = (q_1, \ldots q_i, \ldots q_M)$$

$q_1=1$, when $t_1 \in s$, $q_1=0$, otherwise 0

$$\vec{s}^{(k)} = (s_1^{(k)}, \ldots s_i^{(k)} \ldots s_M^{(k)})$$

$s_1=1$, when $t_1 \in s$, $s_1=0$, otherwise 0

A passage or document D can be represented as a sequence of sentences:

$$D = (\vec{s}^{(1)}, \ldots \vec{s}^{(k)} \ldots \vec{s}^{(K)})$$

The recapitulation ability of each sentence is calculated in equations (5) and (6):

$$P(\vec{s}^{(k)}) = \begin{cases} 1 & k=1 \\ R(\vec{s}^{(k)}, \vec{t}_D) & \text{otherwise} \end{cases} \tag{5}$$

$$t_D = \begin{cases} \text{topic}(D) \\ \vec{s}^{(1)} & \text{otherwise} \end{cases} \tag{6}$$

where topic(D) is an explicit topic sentence for document D.

The continuity between two sentences is measured depending on the physical distance between them. Other measures may be used; but according to the preferred embodiment of the invention, distance is preferred. The continuity is measured by equation (7):

$$C(\vec{s}^{(k1)}, \vec{s}^{(k2)}) = \frac{1}{1+k2-k1} \tag{7}$$

Combining the above data for relevancy, recapitulation, and continuity, a decision function, equation (8), assists the dialog system in deciding which sentences or phrases from a document to present:

$$\text{Score}(\vec{s}^{(k)}, \vec{q}) = \alpha R(\vec{s}^{(k)}, \vec{q}) + \beta P(\vec{s}^{(k)}) \qquad (8)$$

where $\alpha$, $\beta$ are constants and $\alpha+\beta=1$. Example values of $\alpha$ and $\beta$ comprise $\alpha=0.8$, $\beta=0.2$, although other values may be used. The relevancy formula and recapitulation formula may be used to obtain definitions of R and P. The system ranks particular sentences according to this score. Within the given length limit, the system groups the top several sentences with the sequence as they occurred in the document. In addition, when several candidate sentences have the same scores, but not all of them can be used due to the length limit, the system refers to the continuity of these sentences with those that have been determined to be parts of the concise answer and with each other.

The final output is a small set of sentences which is represented as:

$$A = (\vec{s}^{(a1)}, \vec{s}^{(a2i)}, \ldots, \vec{s}^{(an)}) \; a_1 < \ldots < a_i, \ldots < a_n \qquad (9)$$

An evaluation of this final output may cause the entire document to be presented as an answer. The system may calculate a loss function to assess the adequacy of the final output. For example, the following loss function (10) may be used:

$$L(A, D | \vec{q}) = 1 - \frac{\text{Score}(A | \vec{q})}{\text{Score}(D | \vec{q})} = 1 - \frac{\sum_{i=1}^{n} \text{Score}(s^{(a_i)} | \vec{q})}{\sum_{k=1}^{K} \text{Score}(s^{(k)} | \vec{q})} \qquad (10)$$

If the loss function is lower than a certain threshold value, then the system rejects the summarization evaluation and uses the whole document as an answer to the user query. In this manner, the system can prevent the presentation of responses to the user that do not sound natural or normal. In the above loss-function equation, D is the input document and A is the output concise answer according to the query-vector.

Using these principles, the presentation module 208 enables a better preparation of a response to the user that will be transmitted to the TTS 210 module for synthesizing a voice response. These formulas and description are examples of how this process may be accomplished. Other means may also be used to summarize responses to a query from web-site data.

To illustrate the process according to the present invention, FIG. 16 is a screenshot of a web-page www.natural-voices.com 410. The title associated with this page is "AT&T Labs Natural Voices" 412. Data on a web-page 410 and lower-level web-pages may be used to drive the dialog with a user. In the following example dialog, the bolded portions of the text are directly extracted from the web-site. For example, the first prompt from the system uses the text 412 from the web-page 410.

SYS: Hi, this is at&t labs natural voices. How may I help you?
USER: Do you offer your products in many languages?
SYS: the at&t labs natural voices tts release 1.2.1 is available now and supports u.s. English, Latin American, Spanish, and German voice fonts; British English voice fonts will be available soon with many more to follow. However, as new languages and foreign language voice fonts are introduced, it is important to check your tts engine release number to verify that the voice font you order works correctly.

Ok, woodja like to hear more?
USER: No
SYS: What else can I do for you?
USER: How do I purchase your products online?
SYS: and, if you prefer, you can still order all of our products by calling our tts help desk number and speaking to one of the at&t labs natural voices sales associates or fill out the on-line form and let us contact you!
USER: Please tell me your toll-free number
SYS: +1-877-741-4321, for technical support, say "technical support," for customer service, say "customer service," for sales, say "sales."

The dialog strategy can switch between user-initiative mode and system-initiative mode depending on the analysis of the conversation and feedback from the user.

The present invention utilizes preferably the AT&T Watson ASR engine, described in R. D. Sharp, E Bocchieri, C. Castillo, S. Parthasarathy, C. Rath, M. Riley; and J. Rowland, "The Watson Speech Recognition Engine", *Proc. Int. Conf. Acoustic, Speech, Signal Processing*, pages 4065-4068 (1997) and the AT&T TTS system described in M. Beutnagel, A. Conkie, J. Schroeter; Y. Stylianon, and A. Syrdal, "The AT&T Next-Generation TTS System", *Joint Meeting of ASA, EAA and DAGA* (1999).

Once a web-site has been processed and a spoken dialog system generated, another challenge occurs when the web-site content changes or gets updated. Another embodiment of the invention relates to a system and process of automatically synchronizing a spoken dialog system with a web-site. The embodiments generally discussed above relate to the initial deployment of a spoken dialog system associated with a web-site. Prior to the initial deployment, the system processes the web-site data to generate the necessary structured task knowledge bank used to construct the dialog models for the human/computer dialog. Once the spoken dialog service is operational, however, it must adapt as web-sites are periodically updated. For example, an electronics retailer may periodically add information regarding close-out sales or new products. Prices often change for products and services and new products are always being listed at on-line auctions. Information is continually changing on most web-sites. This embodiment of the invention relates to a system and method of insuring that the spoken dialog service will reflect updated information on the site.

FIG. 17 illustrates the system according to this embodiment of the invention. An automatic detection module 420 communicates with the web-site pages 214 and the web-page reader 212. This detection module 420 detects when new information is added to or when information changes on the web-site 214. In a preferred embodiment of the invention, when the system is running, at every given time interval such as several hours or one day, the web-site is mirrored to the local disk and converted to structured task-data representation. Since, the system is totally based on data files, any changes on that web-site can be immediately utilized.

As an example, assume a new product is offered on web-site 214. The automatic detection module will detect the change in those web-pages thus triggering the process of re-processing those web-pages through the web-page reader 212 as discussed above. A web administrator may also have access to the detection module as he or she manages the additional data to modify and synchronize the new information in the web-site with the spoken dialog service.

The web-page reader 212 performs its parsing, relevant text extraction, and document relationship extraction functions and builds the task knowledge bank 258. In this embodiment of the invention, the new web-site data may be integrated into the current task knowledge bank 258 or depending on the amount of changes to the web-site, the entire web-site may be processed again and a completely new task knowledge bank 258 created. Data generated via use of the spoken dialog system can also be integrated into the new task knowledge bank 258 to take advantage of the live use data.

One of the benefits of the present invention is that the process is automated such that little or no human intervention is involved. Therefore, whether the web-page reader 212 provides an integrated update to synchronize the task knowledge bank 278 with updated web-site information or whether the entire web-site is processed again is immaterial in terms of cost and time to a company.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:
   extracting, via a processor and independent of user input, first task data from a web-site, wherein the first task data is based on a structure of a web page in the web-site;
   formatting the first task data into first formatted task data comprising a first topic section, a first hyperlink section, and a first content/answer section;
   extracting, independent of the user input, second task data from the web-site, wherein the second task data is based on the structure of the web page in the web-site;
   formatting the second task data into second formatted task data comprising a second topic section, a second hyperlink section, and a second content/answer section;
   analyzing the first formatted task data and the second formatted task data, to yield an analysis;
   when, based on the analysis, the first topic section is determined to be thematically coherent with the second topic section, merging the first formatted task data and the second formatted task data into third formatted task data;
   receiving a spoken natural language user query;
   organizing task data into a ranked hierarchical structure based on the spoken natural language user query, wherein the task data comprises one of (1) the first formatted task data and the second formatted task data, and (2) the third formatted task data;
   generating a ranked list of relevant responses to the spoken natural language user query using the ranked hierarchical structure to perform vector space modeling; and
   initiating a two-way, natural language spoken dialog to provide a response to the spoken natural language user query according to the ranked list.

2. The method of claim 1, wherein extracting of the first task data and extracting of the second task data further comprise extracting text from the web-site.

3. The method of claim 2, wherein the text is extracted in text segments.

4. The method of claim 3, wherein merging of the first formatted task data and the second formatted task data further comprises integrating thematically the first formatted task data and the second formatted task data.

5. The method of claim 1, wherein organizing the task data further comprises representing the task data using a plurality of parameters.

6. The method of claim 5, wherein the plurality of parameters comprises a structure code, a parent tag, a text code, a color code, a size, and a link code.

7. The method of claim 6, wherein extracting of the first task data and extracting of the second task data further comprise extracting text from the web-site.

8. The method of claim 7, wherein the text is extracted in text segments.

9. The method of claim 8, further comprising:
   identifying themes with the text segments that have been extracted.

10. The method of claim 9, further comprising:
    determining topic and content pairs associated with the text segments that have been extracted.

11. The method of claim 1, wherein extracting the first task data and the second task data further comprises extracting data relationship information.

12. The method of claim 1, further comprising:
    deleting redundant information.

13. A method comprising:
    detecting, via a processor, when new web-site data is added to a web-site, the new web-site data being based on a structure of a web page in the web-site;
    extracting the new web-site data;
    formatting the new web-site data into new formatted web-site data comprising a new topic section, a new hyperlink section, and a new content/answer section;
    analyzing, via a processor, the new formatted web-site data and old formatted web-site data, to yield an analysis, the old formatted web-site data comprising an old topic section, an old hyperlink section, and an old content/answer section;
    when, based on the analysis, the new topic section is determined to be thematically coherent with the old topic section, merging the new formatted web-site data and the old formatted web-site data into third formatted web-site data;
    receiving a spoken natural language user query;
    organizing web-site data into a ranked hierarchical structure based on the new web site data for the spoken natural language user query, wherein the web-site data comprises one of (1) the new formatted web-site data and the old formatted web-site data, and (2) the third formatted task data;
    generating a ranked list of relevant responses to the spoken natural language user query, using the ranked hierarchical structure to perform vector space modeling; and
    initiating a two-way, natural language spoken dialog to provide a response to the spoken natural language user query based on the ranked list.

14. A method comprising:
    automatically detecting, via a processor, when additional web-site structure data is added to a web-site, wherein the additional web-site structure data is based on a structure of the web-site;
    extracting the additional web-site structure data from the web-site;
    formatting the additional web-site structure data into formatted additional data comprising an additional topic section, an additional hyperlink section, and an additional content/answer section;
    analyzing, via a processor, the formatted additional data and formatted original data, to yield an analysis, wherein the formatted original data comprises an original topic section, an original hyperlink section, and an original content/answer section;

when, based on the analysis, the original topic section is determined to be thematically coherent with the additional topic section, merging the formatted original data and the formatted additional data into third formatted data;

receiving the spoken natural language user query;

organizing data into a ranked hierarchical structure based on the spoken natural language user query, wherein the data comprises one of (1) the formatted original data and the formatted original data, and (2) the third formatted data;

generating a ranked list of relevant responses to the spoken natural language user query using the data; and synchronizing a two-way, natural language spoken dialog to provide a response to the spoken natural language user query according to the ranked list.

15. The method of claim 14, wherein extracting the additional web-site structure data comprises parsing the web-site data, determining relevance of text in the web-site data and determining a relationship of text in the web-site data.

16. A system comprising:
a processor; and
a computer-readable storage medium having instructions stored which, when executed on the processor, perform operations comprising:
  extracting, via a processor and independent of user input, first task data from a web-site, wherein the first task data is based on a structure of a web page in the web-site;
  formatting the first task data into first formatted task data comprising a first topic section, a first hyperlink section, and a first content/answer section;
  extracting, independent of the user input, second task data from the web-site, wherein the second task data is based on the structure of the web page in the web-site;
  formatting the second task data into second formatted task data comprising a second topic section, a second hyperlink section, and a second content/answer section;
  analyzing the first formatted task data and the second formatted task data, to yield an analysis;
  when, based on the analysis, the first topic section is determined to be thematically coherent with the second topic section, merging the first formatted task data and the second formatted task data into third formatted task data;
  receiving a spoken natural language user query;
  organizing task data into a ranked hierarchical structure based on the spoken natural language user query, wherein the task data comprises one of (1) the first formatted task data and the second formatted task data, and (2) the third formatted task data;
  generating a ranked list of relevant responses to the spoken natural language user query-using the ranked hierarchical structure to perform vector space modeling;
  and
  initiating a two-way, natural language spoken dialog using the ranked list.

17. The system of claim 16, wherein organizing the task data into the ranked hierarchical structure further comprises:
extracting, prior to receiving the spoken natural language user query, text and text attributes from the task data.

18. The system of claim 17, wherein organizing the task data into the hierarchical structure further comprises:
identifying function hypertext markup language pages in the web-site.

19. The system of claim 18, wherein organizing the task data into the ranked hierarchical structure further comprises:
filtering content in the web-site.

20. The system of claim 19, wherein organizing the task data into the ranked hierarchical structure further comprises:
identifying a role of text in the web-site and a relationship between the text.

21. The system of claim 19, wherein filtering content in the web-site further comprises eliminating redundancy.

22. A computer-readable storage device having instructions which, when executed on a computing device, cause the computing device to perform operations comprising:
  parsing web-site data independent of user input, the web-site data being based on a structure of a web-page in a web-site, yielding parsed web-site data;
  formatting the parsed web-site data into formatted parsed web-site data comprising a parsed topic section, a parsed hyperlink section, and a parsed content/answer section such that a text segment from the web-page is extracted and represented using the task data;
  analyzing the formatted parsed web-site data and formatted old web-site data, to yield an analysis, the formatted old web-site data comprising an old topic section, an old hyperlink section, and an old parsed content/answer section;
  when, based on the analysis, the parsed topic section is determined to be thematically coherent with the old topic section, merging the formatted parsed web-site data and the formatted old web-site data into a third formatted web-site data;
  receiving a spoken natural language user query;
  organizing web-site data into a ranked hierarchical structure based on the spoken natural language user query, wherein the web-site data comprises one of (1) the formatted parsed web-site data and the formatted old web-site data, and (2) the third formatted web-site data;
  generating a ranked list of relevant responses to the spoken natural language user query using the ranked hierarchical structure to perform vector space modeling; and
  using a spoken dialog model to generate a spoken, audible response to the spoken natural language user query based on the ranked list; and
  initiating a two-way, natural language spoken dialog which delivers the spoken, audible response.

23. The computer-readable storage device of claim 22, wherein the two-way, natural language dialog is generated by summarizing a long text segment from the web-site while generating the spoken, audible response to the spoken natural language user query.

24. A system comprising:
a processor; and
a computer-readable storage medium having instructions stored which, when executed on the processor, cause the processor to perform operations comprising:
  parsing web-site data, independent of user input, the web-site data being based on a structure of a web-site to yield parsed web-site data;
  formatting the parsed web-site data, to yield formatted parsed web-site data comprising a parsed topic section, a parsed hyperlink section, and a parsed content/answer section;
  analyzing the formatted parsed web-site data and formatted old web-site data, to yield an analysis, the formatted old web-site data comprising an old topic section, an old hyperlink section, and an old parsed content/answer section;

when, based on the analysis, the parsed topic section is determined to be thematically coherent with the old topic section, merging the formatted parsed web-site data and the formatted old web-site data into a third formatted web-site data;

receiving a spoken natural language user query;

organizing web-site data into a ranked hierarchical structure based on the spoken natural language user query, wherein the web-site data comprises one of (1) the formatted parsed web-site data and the formatted old web-site data, and (2) the third formatted web-site data;

generating a ranked list of relevant responses to the spoken natural language user query using the web-site data to perform vector space modeling; and using the ranked list to generate a spoken, audible response to the spoken natural language user query from web-site content as part of a two-way natural language spoken dialog, wherein the two-way, natural language spoken dialog is configured for operating without translating web-pages of the web-site.

25. The system of claim 24, wherein the spoken, audible response to the spoken natural language user query from the web-site content comprises a portion of the web-site content associated with the spoken natural language user query.

26. The system of claim 24, further comprising summarizing long text segments to generate the spoken, audible response.

27. A method comprising:
parsing web-site data, via a processor and independent of user input, the web-site data being based on a structure of a web-site, to yield parsed web-site data;
formatting the parsed web-site data, to yield formatted parsed web-site data comprising a parsed topic section, a parsed hyperlink section, and a parsed content/answer section;
analyzing the formatted parsed web-site data and formatted old web-site data, to yield an analysis, the formatted old web-site data comprising an old topic section, an old hyperlink section, and an old parsed content/answer section;
when, based on the analysis, the parsed topic section is determined to be thematically coherent with the old topic section, merging the formatted parsed web-site data and the formatted old web-site data into third formatted web-site data;
receiving, via a processor, a spoken natural language user query;
organizing web-site data into a ranked hierarchical structure based on the spoken natural language user query, wherein the web-site data comprises one of (1) the formatted parsed web-site data and the formatted old web-site data, and (2) the third formatted web-site data;
generating a ranked list of relevant responses to the spoken natural language user query using data from the ranked hierarchical structure to perform vector space modeling;
generating a spoken, audible response to the spoken natural language user query using the ranked hierarchical structure; and initiating a two-way natural language spoken dialog to provide a response to the spoken natural language user query based on the ranked list.

28. The method of claim 27, wherein the spoken, audible response is further generated using a portion of the parsed web-site data that relates to the spoken natural language user query.

29. The method of claim 28, wherein generating the spoken, audible response to the spoken natural language user query based on ranked hierarchical structure data further comprises generating a hierarchical tree.

30. The method of claim 29, wherein generating the spoken, audible response further comprises:
extracting text attributes;
identifying web-page functions;
filtering web-site content; and
identifying text relationships.

31. A method comprising:
receiving, via a processor, a spoken natural language user query;
receiving text associated with the spoken natural language user query;
receiving first web-site data based on a structure of a web-site;
formatting the first web-site data into first formatted web-site data comprising a first topic section, a first hyperlink section, and a first content/answer section;
receiving second web-site data based on a structure of the web-site;
formatting the second web-site data into second formatted web-site data comprising a second topic section, a second hyperlink section, and a second content/answer section;
analyzing the first formatted web-site data and the second formatted web-site data, to yield an analysis;
when, based on the analysis, the first topic section is determined to be thematically coherent with the second topic section, merging the first formatted web-site data and the second formatted web-site data into a third formatted web-site data;
organizing web-site data into a ranked hierarchical structure based on the spoken natural language user query and the text, wherein the web-site data comprises one of (1) the first formatted web-site data and the second formatted web-site data, and (2) the third formatted web-site data;
generating a ranked list of relevant response to the spoken natural language user query using the ranked hierarchical structure to perform vector space modeling;
generating a spoken, audible response to the spoken natural language user query using the ranked hierarchical tree via a two-way, natural language spoken dialog; and
presenting the spoken, audible response to the user.

32. The method claim 31, further comprising:
summarizing information from the web-site when generating the spoken, audible response.

33. The method of claim 31, wherein organizing of the web-site data into the ranked hierarchical structure further comprises receiving context information regarding a current dialog.

* * * * *